Jan. 6, 1925.
H. D. ARNOLD
AMPLIFIER CIRCUITS
Filed July 11, 1919
1,521,852
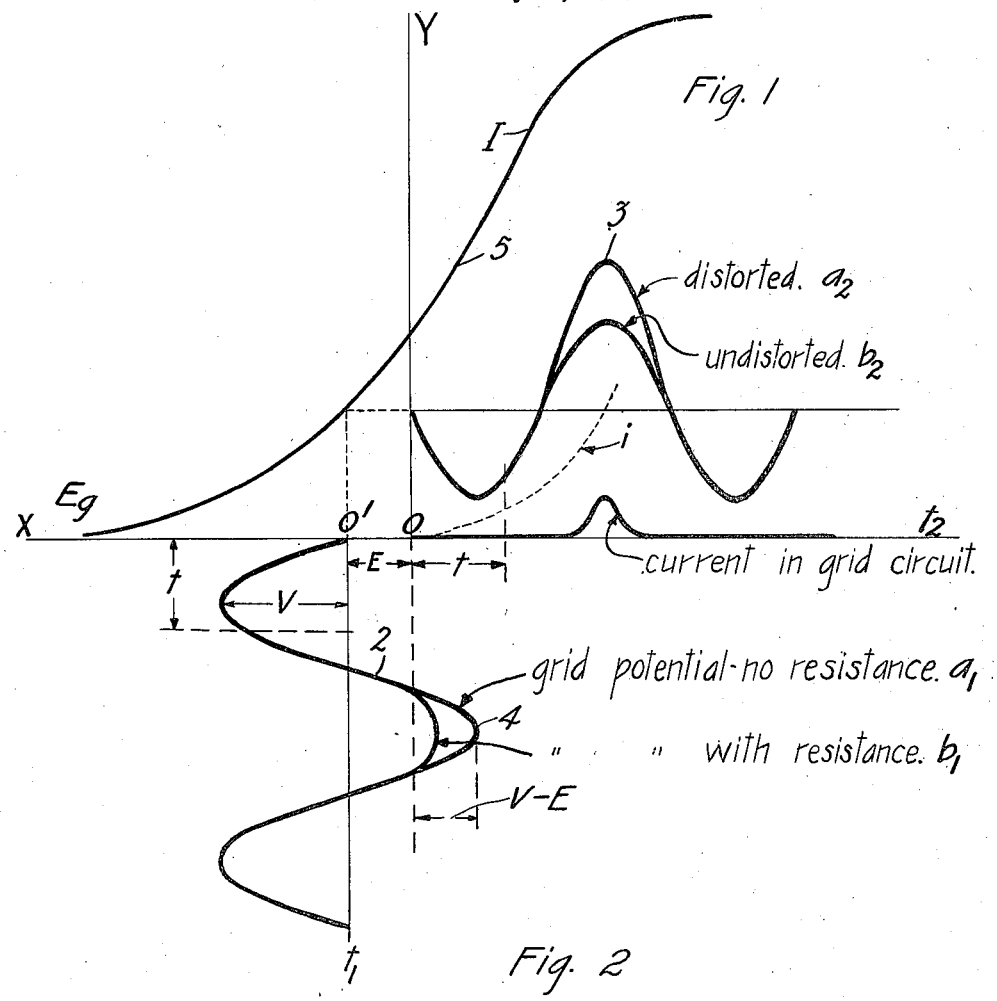
Fig. 1
Fig. 2
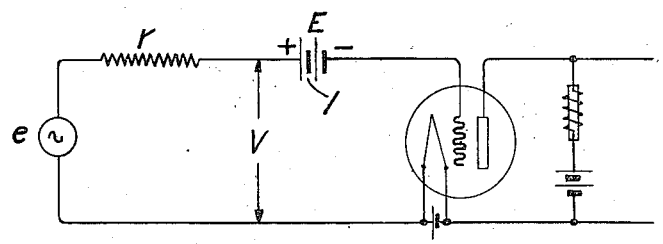
Inventor:
Harold D. Arnold.
by J. E. Roberts Atty.

Patented Jan. 6, 1925.

1,521,852

UNITED STATES PATENT OFFICE.

HAROLD D. ARNOLD, OF MAPLEWOOD, NEW JERSEY, ASSIGNOR TO WESTERN ELECTRIC COMPANY, INCORPORATED, OF NEW YORK, N. Y., A CORPORATION OF NEW YORK.

AMPLIFIER CIRCUITS.

Application filed July 11, 1919. Serial No. 310,063.

*To all whom it may concern:*

Be it known that I, HAROLD DE F. ARNOLD, a citizen of the United States, residing at Maplewood, in the county of Essex and State of New Jersey, have invented certain new and useful Improvements in Amplifier Circuits, of which the following is a full, clear, concise, and exact description.

The invention relates to electron discharge devices, such as are employed for repeating or amplifying electrical impulses. It relates to the reduction of distortion of the waves transmitted by such a repeater.

It is a known fact that the relation between the space current in an electron repeater and the grid voltage is not a straight line and consequently the variation in space current, due to an applied voltage on the control electrode or grid, is not a faithful copy of the applied voltage. This variation in space current is commonly used for producing amplified signals, although the amplifier may also be used as an oscillation generator in case a coupling between the input and output circuits is supplied.

The distorting effect as shown by the non-linear characteristic may be minimized, according to the present invention, by making use of the fact that the grid characteristic is also non-linear and that the grid takes current only when it is positive. According to the present invention a resistance is introduced into the grid circuit so that at such times as the grid takes current the effective grid potential is less than the impressed electromotive force by the potential drop across this resistance. This reduces the effective grid potential and consequently reduces the space current thereby preventing distortion. Compensation is accordingly provided for the excessive increase in space current, which would otherwise take place when the grid becomes positive and distortion of the repeated waves is prevented or at least reduced.

For further details of the invention reference may be made to the drawings, in which Fig. 1 comprises curves showing how the distortion is reduced; Fig. 2 illustrates diagrammatically a vacuum tube circuit embodying the present invention.

Referring in detail to Fig. 1, I, $i$, if distance along the axis O Y is taken to represent current, and distance along the axis O X to represent potential difference between grid and filament, then curves I, $i$ represent respectively the relation of plate and grid currents to grid-filament potentials. In order to represent the relations existing between plate current, grid current, and grid potential at any given phase of a sinusoidal electromotive force $e$, we will relate all these values to the common variable time, by letting the abscissa O X and the vertical ordinate O'$t_1$ both represent extension in time. That is, points on the current curves $a_2$, $b_2$ at a given distance to the right of the origin O occur at the same instant as points on the voltage curves $a_1$, $b_1$ at the same distance from the origin O'.

The electromotive force which it is desired to repeat and amplify is shown in Fig. 2 as derived from a generator of sinusoidal electromotive force $e$, but obviously it may also come from a coupling with the output circuit as when the tube is used as an oscillation generator. The effective potential V, due to this generator, is represented in Fig. 1 along the vertical axis of time $t_1$, the axis $t_1$ being chosen to the left of the main vertical axis Y by an amount E corresponding to the constant voltage supplied by the battery 1 in Fig. 2. The corresponding variations in space current are shown in the usual way on the horizontal axis $t_2$.

The amplitude of the voltage V as drawn about the vertical time axis $t_1$ has been chosen large enough so that the loop 2 representing one half wave of this voltage will extend to the right of the extension of the main axis Y, which corresponds to that condition of the grid being positive with respect to the filament. The portion V—E represents the amount by which the grid is positive with respect to the filament, that is, the amount by which the electromotive force to be repeated is larger than the steady electromotive force E.

Two cases are to be noted. In the first place consider that there is no resistance in the grid circuit so that the grid potential is equal to V+E even when the grid goes positive and takes current, due to picking up electrons from the cathode. Then the grid potential and space current will be as shown by the curves marked $a_1$ and $a_2$ respectively. The space current variation is a much distorted copy of the electromotive force which it is desired to repeat.

Point 3 on the curve $a_2$ is determined, of course, by projecting the point 4 on the curve 2 in a vertical direction until it meets the curve I at point 5 and then projecting the point 5 to the right along the time axis $t_2$ the same distance that the point 4 is distance from $O'$ along the axis $O't_1$. The other points on the curve $a_2$ are located in a similar manner.

Now suppose a resistance $r$ is introduced into the grid circuit. The grid potential $V+E$ will now be equal to $e+E$ except for a time when current is flowing in the grid circuit, during which time it will be less than $e+E$ by an amount $IR$ where $I$ is the current flowing in the grid circuit. This $IR$ drop occurs at just the proper time to limit the otherwise undesirably high value of space current which would otherwise occur due to the increasing slope of the characteristic curve I. The two curves marked $b_1$ and $b_2$ represent the result obtained when this resistance is employed. Although the potential actually operating the grid is now distorted, it is seen that the space current follows much more nearly the form of the impressed electromotive force $e$.

The value of the negative C battery, E, and the value of the resistance $r$, should be chosen with due regard to the operating characteristics of the tube and to the electromotive force to be amplified.

It has been found that when this invention is applied to an oscillation generator there is a reduction in the value of the second harmonic which would otherwise be present and there is a consequent gain in the power output at the fundamental frequency.

While for convenience of exposition the source $e$ has been described as sinusoidal, the above considerations hold for electromotive forces of any wave form.

What is claimed is:

1. The method of producing an amplified substantially faithful copy of an impulse to be repeated by an electric discharge device having an anode, a cathode and a control electrode, which method comprises overcoming the distortion of said impulse which tends to take place when the impulse is of sufficient strength to make the control electrode positive to the cathode by causing the control electrode potential to respond non-linearly to changes in the voltage of the impulse to be repeated.

2. In combination, an incoming line and means associated with said line for amplifying impulses from said line substantially without distortion, said means including a vacuum tube having an anode, a cathode and a control electrode, a source of voltage connected between said anode and cathode, means for maintaining said control electrode negative at times with respect to said cathode, and a resistance in series with said line, said control electrode and said cathode of such a value with respect to the strength of the impulses to be repeated and the characteristics of the amplifier as to substantially prevent distortion of the repeated impulse due to the curvilinear relation between control electrode potential and anode current.

3. An electron discharge amplifier for amplifying electrical impulses, said amplifier having an input circuit including a control electrode, and means associated with said input circuit for preventing said amplifier from producing substantial distortion in said impulses when said control electrode becomes positive with respect to said cathode, said means having negligible effect on the amplification of said impulses when said control electrode is negative with respect to said cathode.

4. A vacuum tube amplifier of the audion type comprising an anode, a cathode and a grid, a source of potential for making the grid negative with respect to the cathode, a source of impulse to be repeated without change of character and of sufficient value to overcome said first-mentioned source whereby said grid becomes at times positive with respect to said cathode, and means to reduce distortion when said grid becomes positive.

In witness whereof, I hereunto subscribe my name this 9th day of July, A. D. 1919.

HAROLD D. ARNOLD.